Sept. 15, 1953    R. M. CHRISTNER    2,652,546
UNIVERSAL CONNECTION FOR ELECTRIC SERVICE CORDS
Filed June 11, 1949

INVENTOR.
ROBERT M. CHRISTNER.
BY
Christy, Parmelee, & Strickland
ATTORNEYS.

Patented Sept. 15, 1953

2,652,546

UNITED STATES PATENT OFFICE 2,652,546

UNIVERSAL CONNECTION FOR ELECTRIC SERVICE CORDS

Robert M. Christner, Pittsburgh, Pa.

Application June 11, 1949, Serial No. 98,520

4 Claims. (Cl. 339—7)

1

This invention is for a universal swivel for use in connection with electric service cords for electric appliances and equipment.

My invention has for its objects to provide a connector for use in electric service cords which will swivel or turn easily, being rotatable through a full 360°, and in addition tilt or rock through a wide angle, providing both a swivel and a universal or angular motion. The invention has for its further objects to provide a device of this character, which, while freely movable, will be safe, non-arcing, capable of carrying heavy currents, and relatively inexpensive to manufacture.

Devices of the kind to which the present invention pertains are especially useful in connection with the service cords of portable or movable electrical appliances and equipment or lights, and are for the purpose of preventing the cord from becoming twisted and knotted, or protect it from being repeatedly sharply flexed where it joins the appliance or equipment or another cord.

In the present application, I have specifically shown one embodiment of my invention designed for use as a connection for two electric service cords, or for use in plugging a service cord into a convenience outlet, but it will be understood that this is by way of illustration and that the invention may be built into electrical appliances such as irons, vacuum cleaners, portable tools or the like, as may be required.

My invention may be more fully understood by reference to the accompanying drawings wherein the device is illustrated on a scale somewhat larger than is actually required, and wherein.

Figure 1:
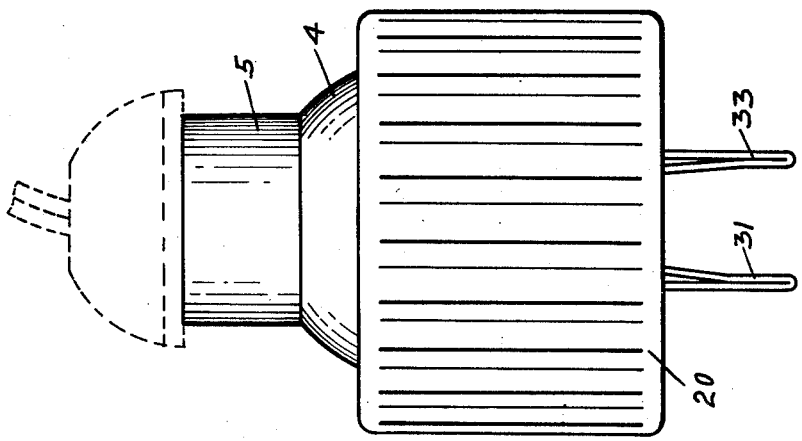
Fig. 1 is a side elevation of the universal swivel connector of my invention.
Figure 2:
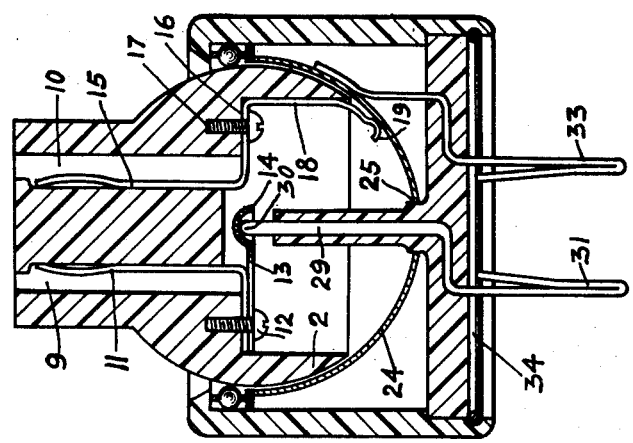
Fig. 2 is a longitudinal vertical section therethrough.
Figure 3:
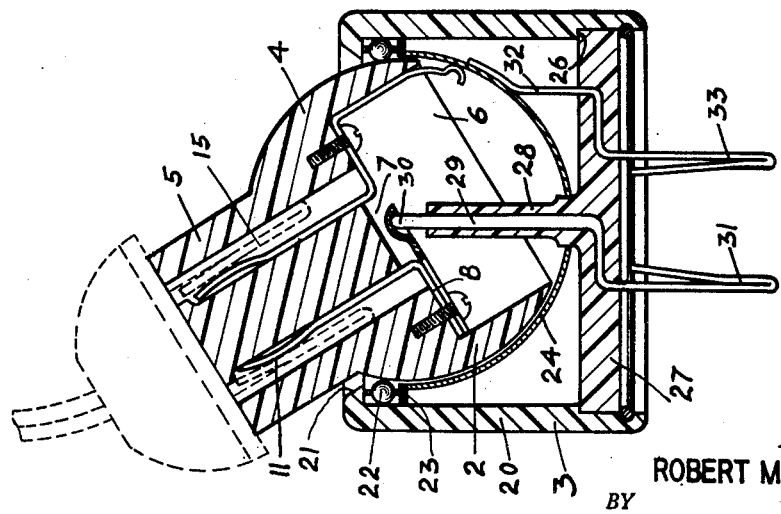
Fig. 3 is a similar section with one of the parts tilted toward the extreme limit of its angular range of movement.

The connector is comprised of two relatively movable main parts, one of which is roughly round or spherical and will be designated the ball member. The ball member is designated generally as 2. The other main member embraces the ball member and is herein called the socket member. It is designated 3.

The ball member 2 comprises a body of insulating material, such for example as molded plastic, hard rubber or the like, having a generally spherical head 4 and a projection 5. The inner end face of the head or ball portion is cut off square, and there is a circular cavity 6 therein that extends inwardly beyond the center of the

2 head. The diameter of the cavity is preferably greater than the radius of the ball.

The bottom of the cavity is countersunk, as indicated at 7, leaving a shoulder 8 at the bottom of the cavity. Two openings, 9 and 10, extend from the countersink 7 to the end of the projection 5, these openings preferably being located symmetrically on each side of the center line of the projection and having the distance between them corresponding to the standard distance for connector blades of the ordinary appliance cord 10.

Secured to the shoulder 8 adjacent the opening 9 is a metal contact strip 11 which is secured in place by a screw 12, the same screw also holding in place a metal strip 13 having a small metal cup 14 at its inner end.

There is also secured to the shoulder 8 a second contact strip 15 that extends into the opening 10, the strip having an offset 16 therein to permit it to seat on the shoulder, there being a screw 17 for securing it in place. The strip has a portion 18 that extends down along the wall of the cavity 6 and it has a rounded terminal 19 that projects beyond the end of the ball, the strip 18 being slightly curved, as shown, just above the terminal.

The socket element of the device comprises a molded plastic or other appropriate sleeve or like body 20 having a cylindrical interior. It is here shown as a sleeve, but if formed as a part of an appliance, as for example an electric iron, it would possibly take other form. The sleeve has an inturned lip 21 at the top. Below this lip is a ball race with balls 22, the ball race in turn resting on a fiber ring 23. The opening defined by the lip 21 is less than the diameter of the ball, so that assembly of this particular form is made by first inserting the ball race and balls, then inserting the ball member through the bottom end of the sleeve before the sleeve is closed at the bottom.

After the parts have been thus assembled, a hemispherical metal cup or shell 24 is inserted, this shell bearing against the fiber ring 23. The shell has a central opening in its bottom at 25.

The sleeve 20 at the end opposite the lip 21 has an internal shoulder 26. A plastic or other insulating base 27 in the form of a disk is pressed in against this shoulder. It has a central pillar or post 28 that extends through the hole 25 in the metal shell up into the cavity 6. It is molded or otherwise formed with a metal post 29 therein, this metal post projecting beyond the post 28 and having an exposed terminal 30 at its top. This terminal is at the center of the ball element 2, and it presses against the little contact cup 14, the strip 13 being somewhat resilient. The post 29 has a conductor here shown as a contact blade 31 that extends beyond the base.

The base is also provided with a resilient metal contact element 32 that is molded into it, and which has a contact portion such as blade 33 at its outer end, the blades 31 and 33 being spaced to fit a standard receptacle. The element 32 presses against the metal shell 24 to make a good electrical contact therewith.

The base is held in place by a split wire ring 34, in an annular internal recess in the sleeve 20, but it may be cemented or fused in place if desired, or some other assembly may be provided.

When the parts are thus assembled, one electric current path is through blade 31, post 29, terminal 30, contact 14, conductor 13, to blade 11. The other current path is through blade 33, conductor 32, shell 24, terminal 19, which is resiliently pressed against the interior of the shell, conductor 18 and blade or strip 15.

As thus constructed the device may be easily manufactured and assembled. The parts freely rotate axially with respect to one another, and in addition relative angular movement through an arc of more than 90° is permitted. The ball bearings, while providing for free relative movement are not essential, especially if plastic having a hard, smooth surface is employed.

By reason of the positioning of one contact, i. e., the terminal 30 and the member 14 at the center of rotation and angular movement of the ball and the other contact in the form of a continuous hemispherical cup or shell concentric with the surface of the terminal 30, contact is maintained at every position to which the parts may be turned or adjusted, and there is no break in the circuit as relative motion occurs. The device is safe, in that the electrically conducting parts are all housed within the insulating body and no part of the ball element carries any exposed conductor.

As hereinbefore indicated, I have shown one embodiment of my invention but the shape and style of the parts and manner of assembly may be variously modified to adapt the invention to various appliances.

I claim:

1. A universal swivel connector comprising a socket member of cup-like form made of insulating material having an inturned lip at the top thereof and having a central pin with a contact terminal at the bottom thereof extending up into the socket, a semi-circular metal shell in the socket member through which the pin projects and from which it is insulated, a ball member made of insulating material in the socket having a ball portion and an extension, the ball portion having a cavity in the end thereof into which said central pin in the socket projects, the terminal of the pin being at the center of the ball portion, the ball portion being received in said semi-circular metal shell, the inturned lip on the socket overhanging the ball portion to restrain the parts against endwise separation, the cavity of the ball portion being provided with a contact element that rests on the terminal of the pin, the cavity of the ball portion also being provided at a point remote from the center with another contact that bears on the interior of the metal shell, said extension of the ball member being provided with openings for the reception of contact blades, the openings each having a conductor therein, the conductor in one opening leading to one of said contacts in the cavity, and the conductor in the other cavity leading to the other contact in the cavity, and a pair of conductors on the socket leading to the shell and pin respectively.

2. A universal swivel connector comprising a socket member of cup-like form made of insulating material having an inturned lip at the top thereof and having a central pin with a contact terminal at the bottom thereof extending up into the socket, a semi-circular metal shell in the socket member through which the pin projects and from which it is insulated, a ball member made of insulating material in the socket having a ball portion and an extension, the ball portion having a cavity in the end thereof into which said central pin in the socket projects, the terminal of the pin being at the center of the ball portion, the ball portion being received in said semi-circular metal shell, the inturned lip on the socket overhanging the ball portion to restrain the parts against endwise separation, the cavity of the ball portion being provided with a contact element that rest on the terminal of the pin, the cavity of the ball portion also being provided at a point remote from the center with another contact that bears on the interior of the metal shell, said extension of the ball member being provided with openings for the reception of contact blades, the openings each having a conductor therein, the conductor in one opening leading to one of said contacts in the cavity, and the conductor in the other cavity leading to the other contact in the cavity, a pair of conductors on the socket leading to the shell and pin respectively, and ball bearings between the ball portion and the socket located between the ball portion and the socket just immediately under said inturned lip.

3. A universal swivel connector for electric circuits comprising a socket member of insulating material having a cylindrical body with an inturned lip portion at one end and having a separate base at the other end which may be secured in place when the assembly is otherwise complete, a ball member of insulating material having a ball portion and a stem portion, the ball portion being of a size that it may be inserted in the socket before the base is in place, but which is too large to pass the inturned lip portion, the stem portion projecting from the socket beyond said inturned lip, a hemispherical conducting shell in the socket member surrounding the inner half of said ball portion, said shell having a central opening therein, the ball portion having an open cavity in the end thereof opposite the extension, said separate base having a contact therein which passes up through the opening in said conducting shell to the center of the ball portion, the ball portion having a contact thereon at substantially the center thereof which bears against said last-named contact on the base, the ball portion having another contact remote from the center which bears against the inner surface of said hemispherical shell, said base member having another contact which bears against said hemispherical shell, the projection on the ball portion having terminals therein leading to the respective contacts mounted in the ball portion.

4. A universal swivel connector for electric circuits comprising a socket member of insulating material formed of two parts, one of which is substantially cylindrical and has an inturned integral flange, and the other of which is a base portion that is separately joined to the first part, a ball member engaged in the socket member having a ball portion and a stem portion, the ball portion being of a diameter such that the flange on the socket member will restrain the ball portion from being withdrawn through the socket member past said flange, the projection on the ball portion extending outwardly away from the socket member, said ball portion having a cavity therein opposite said extension, a substantially hemispherical metal shell in the socket member surrounding the inner end of said ball portion and in which the ball portion has a working fit, the ball portion having a contact thereon which bears against the inner surface of the shell, the shell having a central opening therein, the base part of the socket having a projection thereon which passes through the opening in said shell and in which is a conductor that extends to the center of the ball member, the base member also having a contact blade that connects with said contact, the base member having another contact blade member that is connected with said shell, the ball member having a contact at the center thereof which bears against the end of said conductor on the base member, and terminals on the projecting part of the ball member leading to the respective contacts on the ball member.

ROBERT M. CHRISTNER.

References Cited in the file of this patent

UNITED STATES PATENTS

| Number | Name | Date |
|---|---|---|
| 1,431,325 | Pedersen | Oct. 10, 1922 |
| 2,007,617 | Sheward | July 9, 1935 |
| 2,104,198 | Jones | Jan. 4, 1938 |
| 2,181,145 | Mose | Nov. 28, 1939 |

FOREIGN PATENTS

| Number | Country | Date |
|---|---|---|
| 111,793 | Australia | Oct. 24, 1940 |
| 317,732 | England | Aug. 20, 1929 |
| 545,514 | France | Oct. 13, 1922 |